United States Patent
Renfors et al.

(10) Patent No.: US 10,742,356 B2
(45) Date of Patent: Aug. 11, 2020

(54) MULTI-WINDOW FAST CONVOLUTION PROCESSING

(71) Applicant: NOKIA TECHNOLOGIES OY, Espoo (FI)

(72) Inventors: Markku Renfors, Tampere (FI); Juha Yli-Kaakinen, Tampere (FI); Toni Levanen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/295,631

(22) Filed: Mar. 7, 2019

(65) Prior Publication Data

US 2019/0280818 A1 Sep. 12, 2019

(30) Foreign Application Priority Data

Mar. 9, 2018 (FI) ........................................ 20185224

(51) Int. Cl.
*H04L 1/00* (2006.01)
*H04L 5/00* (2006.01)
*H04L 27/26* (2006.01)

(52) U.S. Cl.
CPC .......... *H04L 1/0064* (2013.01); *H04L 5/0007* (2013.01); *H04L 27/2607* (2013.01); *H04L 27/2628* (2013.01); *H04L 27/2634* (2013.01)

(58) Field of Classification Search
CPC . H04L 1/0064; H04L 5/0007; H04L 27/2607; H04L 27/2628; H04L 27/2634
USPC ........................................ 370/310, 328, 329
See application file for complete search history.

(56) References Cited

U.S. PATENT DOCUMENTS

| | | | | |
|---|---|---|---|---|
| 2015/0372843 A1* | 12/2015 | Bala | ... | H04L 25/03834 375/295 |
| 2016/0294521 A1* | 10/2016 | Au | ... | H04L 5/0064 |
| 2017/0230138 A1* | 8/2017 | Xiong | ... | H04L 1/0003 |

FOREIGN PATENT DOCUMENTS

| | | |
|---|---|---|
| EP | 2 913 953 A1 | 9/2015 |
| WO | WO 2018/041346 A1 | 3/2018 |

OTHER PUBLICATIONS

Opinion on Patentability dated May 28, 2018 corresponding to Finnish Patent Application No. 20185224.
Keiichi Mizutani et al., "A Comprehensive Study of Universal Time-domain Windowed OFDM-based LTE Downlink System," In: The 20th International Symposium on Wireless Personal Multimedia Communications (WPMC2017), Bali, Indonesia: IEEE, Dec. 2017.

(Continued)

*Primary Examiner* — Obaidul Huq
(74) *Attorney, Agent, or Firm* — Squire Patton Boggs (US) LLP

(57) ABSTRACT

According to an aspect, there is provided a waveform processing device. Said waveform processing device comprises means for performing the following. Upon receiving one or more input signals, each of which corresponds to a different subband, the waveform processing device segments each of the one or more input signals to a subband-specific set of parallel signal blocks. Then, the waveform processing device filters each subband-specific set by applying at least a first time window function, a transform-plane window function and a second time window function in this order. Finally, the waveform processing device concatenates filtered signals to an output signal.

15 Claims, 11 Drawing Sheets

(56) References Cited

OTHER PUBLICATIONS

Intel Corporation, "Further considerations on NR waveform with improved spectral containment," R1-1612167, 3GPP TSG RAN WG1 Meeting #87, Reno, USA, Nov. 14, 2016.

Nokia et al., "Subband-wise filtered OFDM for New Radio below 6 GHz," R1-165014, 3GPP TSG-RAN WG1 #85, Nanjing, P.R. China, May 23, 2016.

E. Paulus, "A Fast Convolution Procedure for Discrete Short-Time Spectral Analysis with Frequency-Dependent Resolution," In: IEEE Transactions on Acoustics, Speech, and Signal Processing, Oct. 1984, vol. 32, No. 5, pp. 1100-1104.

Office Action dated Nov. 15, 2018 corresponding to Finnish Patent Application No. 20185224.

Renfors, M. et al. FB-MC and Enhanced OFDM Schemes, Document No. D2.1—Enhanced Multicarrier Techniques for Professional Ad-Hoc and Cell-Based Communications (EMPhAtiC), Sep. 2013.

Yli-Kaakinen, J. et al. Efficient Fast-Convolution-Based Waveform Processing for 5G Physical Layer. IEEE J. Sel. Areas Commun., Jun. 2017, vol. 35, No. 6, pp. 1309-1326, ISSN 0733-8716.

Jul. 9, 2019 Extended Search Report issued in European Patent Application No. 19150653.4.

Juha Yli-Kaakinen et al: "Efficient Fast-Convolution-Based Waveform Processing for 5G Physical Layer", ARXIV.Org, Cornell University Library, 201 Olin Library Cornell University Ithaca, NY 14853, Jun. 9, 2017.

Juha Yli-Kaakinen et al: "Generalized Fast-Convolution-based Filtered-OFDM: Techniques and Application to 5G New Radio", ARXIV. Org, Cornell University Library, 201 Olin Library Cornell University Ithaca, NY 14853, Mar. 6, 2019.

* cited by examiner

MULTI-WINDOW FAST CONVOLUTION PROCESSING

FIELD

Various example embodiments relate generally to wireless communications, and more particularly to waveform processing in a communications system.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

The fifth generation (5G) cellular systems aim to improve the throughput by a huge factor (even up to 1000 or more), which presents a multitude of challenges, especially considering the scarcity of spectrum at low frequency bands and the need for supporting a very diverse set of use cases. In order to reach this goal, it is important to exploit the higher frequencies such as millimeter wave frequencies in addition to the more conventional lower frequencies. To meet the demands of 5G systems, a new, globally standardized radio access technology known as New Radio (NR) has been proposed. Due to diverse service requirements imposed by NR, a high level spectral containment in the transmitter is required to isolate transmissions with different numerology (so called mixed numerology scenarios) or asynchronous traffic. This, in turn, necessitates new types of waveform processing solutions for achieving sufficiently high performance.

YLI-KAAKINEN, J. et al. Efficient Fast-Convolution-Based Waveform Processing for 5G Physical Layer. IEEE J. Sel. Areas Commun., June 2017, Vol. 35, No. 6, pages 1309-1326, ISSN 0733-8716. discloses a solution for fast-convolution-based waveform processing for 5G. Specifically, a fast-convolution-based filtered orthogonal frequency division multiplexing (FC-F-OFDM) providing optimized multiplexing of filtered groups of cyclic prefix (CP)-OFDM physical resource blocks (PRBs) in a spectrally well localized manner. The presented subband filtering solution is able to suppress interference leakage between adjacent subbands, thus supporting independent waveform parametrization and different numerologies for different groups of PRBs, as well as asynchronous multiuser operation in uplink.

RENFORS, M. et al. FB-MC and Enhanced OFDM Schemes, Document Number D2.1-Enhanced Multicarrier Techniques for Professional Ad-Hoc and Cell-Based Communications (EMPhAtiC), September 2013. discloses various waveform processing techniques involving filter banks and/or OFDM modulators. Specifically, time-domain windowing for the purpose of sidelobe suppression and fast-convolution based filtering for multirate filters are discussed for application in broadband Professional Mobile Radio (PMR) system development.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise methods, apparatuses, and computer programs as defined in the independent claims. Further embodiments of the invention are disclosed in the dependent claims.

BRIEF DESCRIPTION OF THE DRAWINGS

In the following, some example embodiments will be described with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
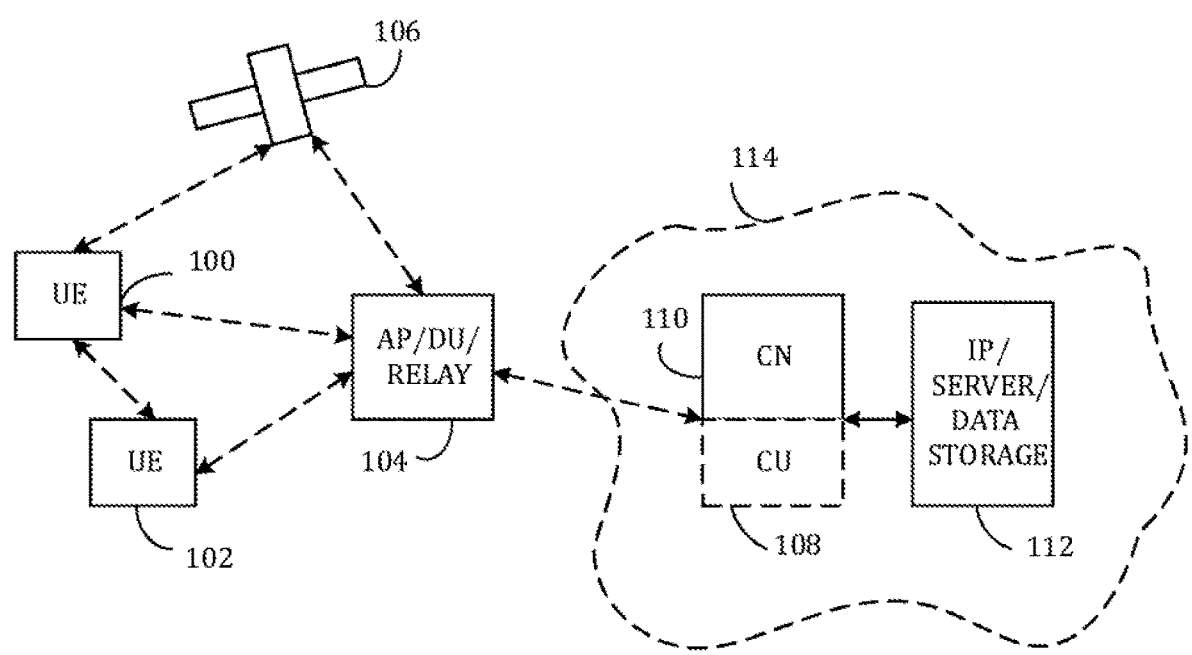
FIG. 1 illustrates an example of a communications system to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication system may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

One key element necessary for achieving high throughput broadband communications envisioned for 5G communication systems like the one shown in FIG. 1 is orthogonal frequency-division multiplexing (OFDM). According to a broad definition, OFDM is a method of encoding digital data on multiple carrier (or subcarrier) frequencies. More specifically, multiple closely spaced orthogonal subcarrier signals with overlapping spectra are used for carrying data. While OFDM is already used in 4G communications systems, the more stringent requirements for the 5G communications systems necessitate improvements to the established methods.

Figure 2:
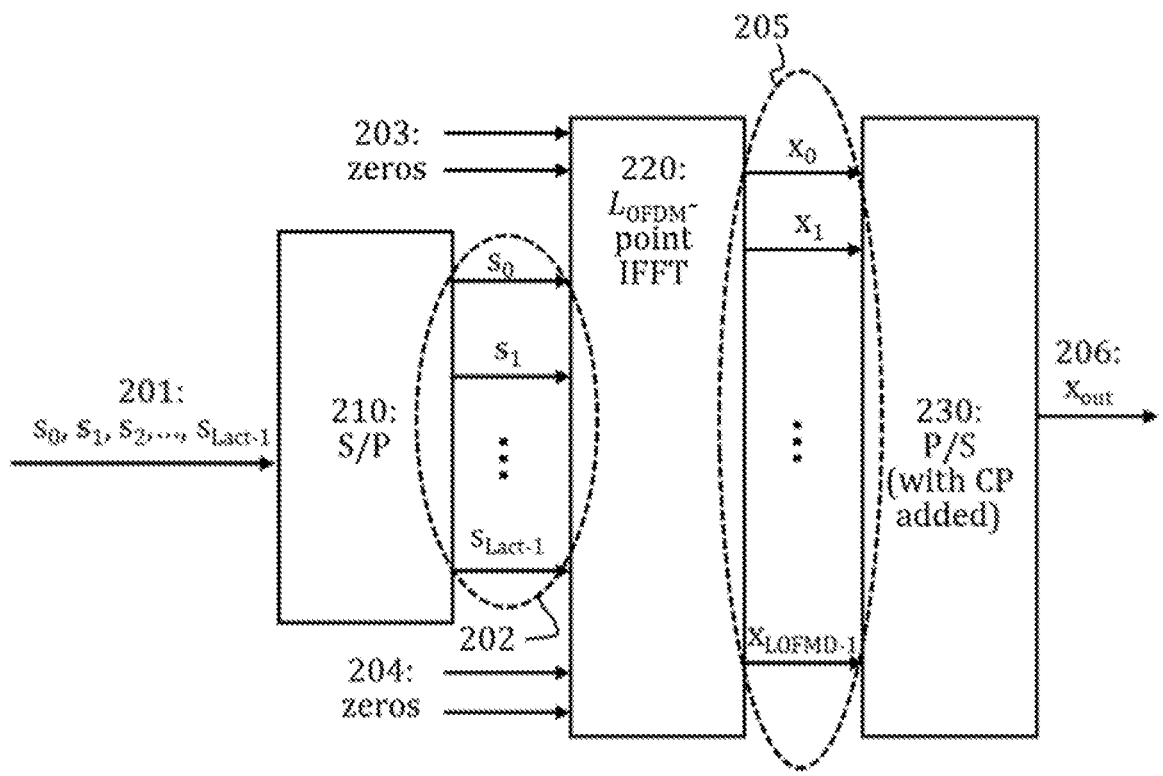
FIG. 2 illustrates fast Fourier transform based orthogonal frequency division multiplexing signal generation according to prior art.

To provide background for the embodiments to be discussed later, a conventional OFDM scheme is briefly discussed in relation to FIG. 2. FIG. 2 illustrates a generic system for generating an OFDM signal in a transmitter using inverse fast Fourier transform (IFFT).

Referring to FIG. 2, $L_{act}$ data symbols $s_0, s_1, s_2, \ldots, s_{L_{act}-1}$ 201 in series format are provided for transmission by a radio transmitter. Each data symbol 201 corresponds to a complex number according to a modulation scheme, e.g., QPSK (quadrature phase shift keying) or 16-QAM (16 quadrature amplitude modulation). From the point of view of the IFFT processing, each data symbol 201 in the series corresponds to a certain carrier frequency. Said data symbols 201 in series are provided as an input for a serial to parallel converter 210. The serial to parallel converter separates the data symbols 201 to $L_{act}$ parallel data streams 202. In the example of FIG. 2, the number of data symbols $L_{act}$ is not equal to the number of inputs $L_{OFDM}$ of the IFFT processing block 220 (i.e., the length of the IFFT). Thus, the input of the IFFT processing block 220 is padded with zeros 203, 204. The IFFT processing block 220 modulates the input data symbols 202, 203, 204 (corresponding to values assigned to frequency bins) and provides $L_{OFDM}$ parallel output signals $x_0, x_1, x_2, \ldots, x_{L_{OFDM}-1}$ 205 (time-domain signals). Due to the intrinsic properties of the IFFT (or Fourier transform in general), the generated carrier signals are always orthogonal. The parallel output signals 205 are provided as an input to a parallel to serial converter 230 which forms an output signal $x_{out}$ comprising one OFDM symbol of $L_{OFDM}$ samples. The output signal may be further fed to a digital-to-analog converter and subsequently to an antenna of the corresponding radio transmitter. The main benefits of the OFDM are the high flexibility and efficiency in allocating the spectral resources to different users, simple and robust way of channel equalization as well as simplicity of combining the multiantenna schemes with core physical layer processing. OFDM or specifically FFT-based OFDM further enables to defining the signal in the frequency domain (in software) and to generate the signal using the computationally efficient, low complexity IFFT. A reverse process to the one illustrated in FIG. 2 needs to be carried out in the receiver receiving the OFDM signal.

In order to prevent the deterioration of the performance of the radio link due to multipath delay spread (that is, due to different multipath components of the transmitted signal arriving at the receiver at different times), a so-called cyclic prefix (CP) may be introduced to each OFDM symbol. This functionality may be performed by element 230. The cyclic prefix refers to an extension of a symbol by inserting a copy of $L_{CP}$ last samples of a symbol to the beginning of said symbol. Said process leads to an extended, but still continuous OFDM symbol (or a CP-OFDM symbol). The signal generated by said process is called a CP-OFDM signal. By choosing the cyclic prefix to be longer than the delay spread, the adverse effects of the delay spread (e.g., loss of orthogonality leading to intersymbol interference, ISI) may be avoided. Obviously, since symbol time is increased, the maximum achievable bit rate of transmission is reduced. In the receiver, an inverse process needs to be performed in order to remove the cyclic prefix.

While the CP-OFDM signal provides a sufficiently efficient solution for the needs of many current generation systems, it has several disadvantages which need to be overcome in order to meet the higher demands of the proposed future communications system. The CP-OFDM signal has relatively high side lobes in spectrum, which causes power leakage to adjacent channels and necessitates the use of larger guard bands which, in turn, degrades the spectral efficiency. Moreover, use of a power amplifier (PA) may further increase said power leakage.

It should be appreciated that the block diagram shown in FIG. 2 is a simplified presentation of the CP-OFDM scheme. The CP-OFDM scheme may further comprise performing, for example, mapping of the signal bits to complex numbers and/or insertion of pilot sequences (unmodulated data used for synchronization and channel estimation).

Figure 3A:
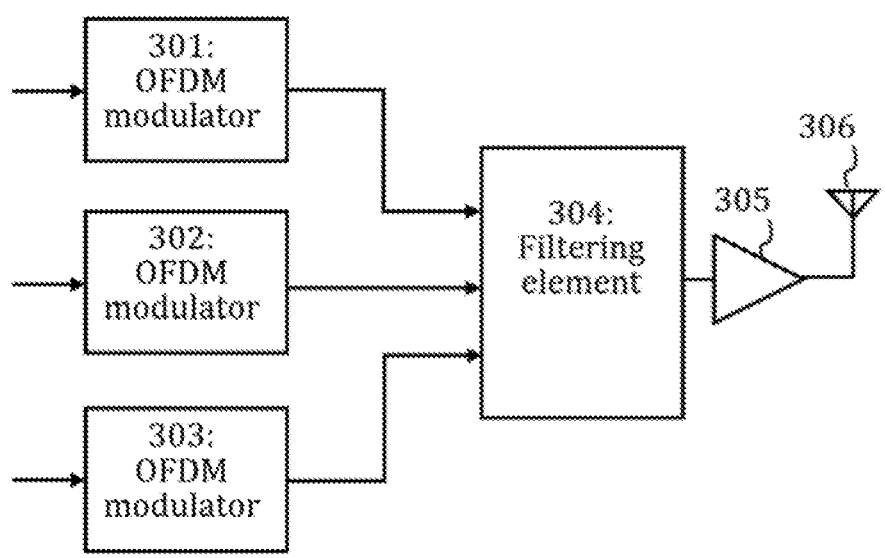
FIGS. 3A and 3B illustrate, respectively, simplified fast Fourier transform based orthogonal frequency division multiplexing transmitter and receiver architectures.
Figure 3B:
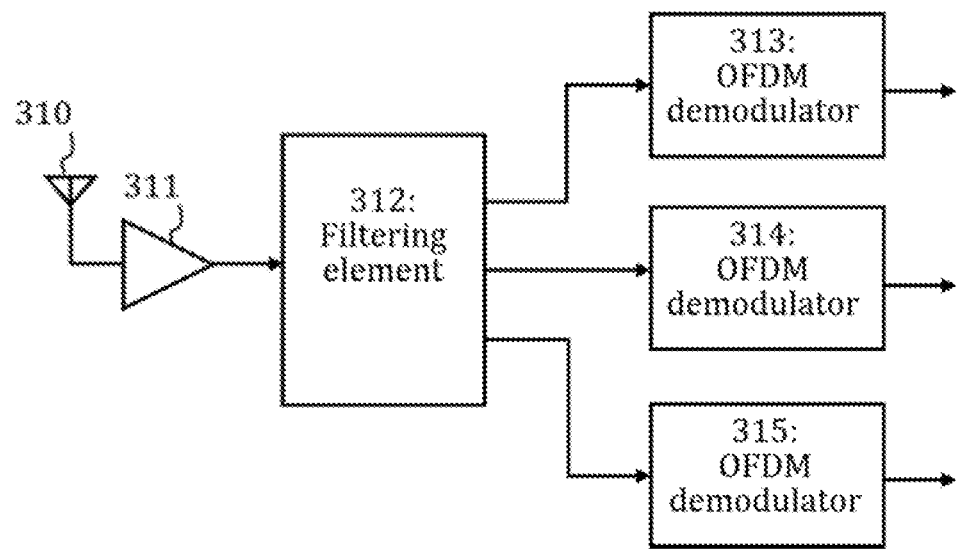

FIGS. 3A and 3B illustrate two solutions for overcoming the aforementioned problems with the CP-OFDM scheme, namely one solution implemented in the transmitter and one solution implemented in the receiver. In FIG. 3A, each of the OFDM modulators 301, 302, 303 may comprise at least some of the elements depicted in FIG. 2. Each OFDM modulator 301, 302, 303 may be configured to provide OFDM modulation for a particular subband of the frequency band of interest. In the scheme illustrated in FIG. 3A, the CP-OFDM signals produced by the OFDM modulators 301 to 303 are further filtered using a filtering element 304 to improve spectral containment. In other words, channel filtering is applied on top of the CP-OFDM technique. Specifically, the filtering element 304 may perform subband-wise filtering of the CP-OFDM signals of the radio channel, that is, first perform the filtering separately for one or more OFDM input signals consisting of one or more subbands to eliminate (or at least mitigate) any unwanted sidelobes, then modulate the filtered subbands to their desired locations, and finally combine the filtered and modulated signals to form a high-rate output signal. After the filtering stage 304, the resulting signal may be coupled via a digital-to-analog converter (not shown in FIG. 3) and an amplifier 305 to an antenna 306 of the transmitter for transmission.

A receiver illustrated in FIG. 3B is configured to perform a reverse process compared to the transmitter of FIG. 3A. Namely, a signal received by an antenna 310 is first amplified by an amplifier 311 and thereafter fed to a filtering element 312 which is configured to filter said received amplifier signal as well as divide it into subband signals. The subband signals are subsequently fed to OFDM demodulators 313, 314, 315 which demodulate the provided OFDM signals, that is, extract the transmitted data symbols from them. While three OFDM demodulators 313, 314, 315 are depicted in FIG. 3B, some receivers may have comprise only one OFDM demodulator (e.g., UE device) and thus be configured to detect only one subband.

Conventionally, the spectral containment of an OFDM signal is improved using time-domain windowing or filtering in filtering element 304. Alternatively, the filtering element 304 may be configured to use a fast-convolution (FC) based approach. In this approach when used at the transmitter side, the filtering is performed by converting each subband CP-OFDM signal to frequency domain using fast Fourier transform (FFT), applying a frequency-domain window to each frequency-domain subband of the CP-OFDM signal (i.e., multiplying each signal point-wise with the frequency-domain window) and converting said signals back to time-domain using IFFT. FC-based approach effectively implements a time-domain convolution between the input signal and the frequency-domain window converted to time domain based on convolution theorem. A reverse FC-based process may be implemented in the filtering element 312 of FIG. 3B of the receiver for improving spectral containment.

The performance of the filtered CP-OFDM scheme may be further improved by dividing the input signal into signal blocks (or segments), processing said signal blocks separately and piecing the processed signal blocks back together (or performing said operations in reverse order in the case of the receiver implementation). In order to avoid detrimental edge effects arising from the segmentation, adjacent signal blocks may be overlapped in the segmenting using either overlap-and-save (OLS) processing or overlap-and-add (OLA) processing. While multiplication in frequency domain as implemented by the frequency-domain window in the aforementioned FC-based approach evaluates cyclic (or circular or periodic) convolution, the OLS and OLA methods may be used to approximate linear convolution using circular convolution by dividing the input signal into segments and employing piece-wise processing to the segmented input signal.

The filtered CP-OFDM as described in the previous paragraph may provide significant improvements in terms of out-of-band emissions compared to conventional CP-OFDM, especially when OLS or OLA scheme is used, and is thus conventionally used, e.g., in LTE systems. However, the 5G NR is required to support higher bandwidth utilization efficiency than LTE, where typically only 90% of the channel bandwidth is utilized. For 5G NR, 96% can be considered as a lower limit for bandwidth utilization efficiency and in most cases systems should support up to 99% bandwidth utilization efficiency, at least with some subcarrier spacings. These higher requirements cannot be easily satisfied with conventional filtered CP-OFDM solutions. Thus, a new solution for waveform processing of CP-OFDM signals is needed to meet these requirements.

Figure 4:
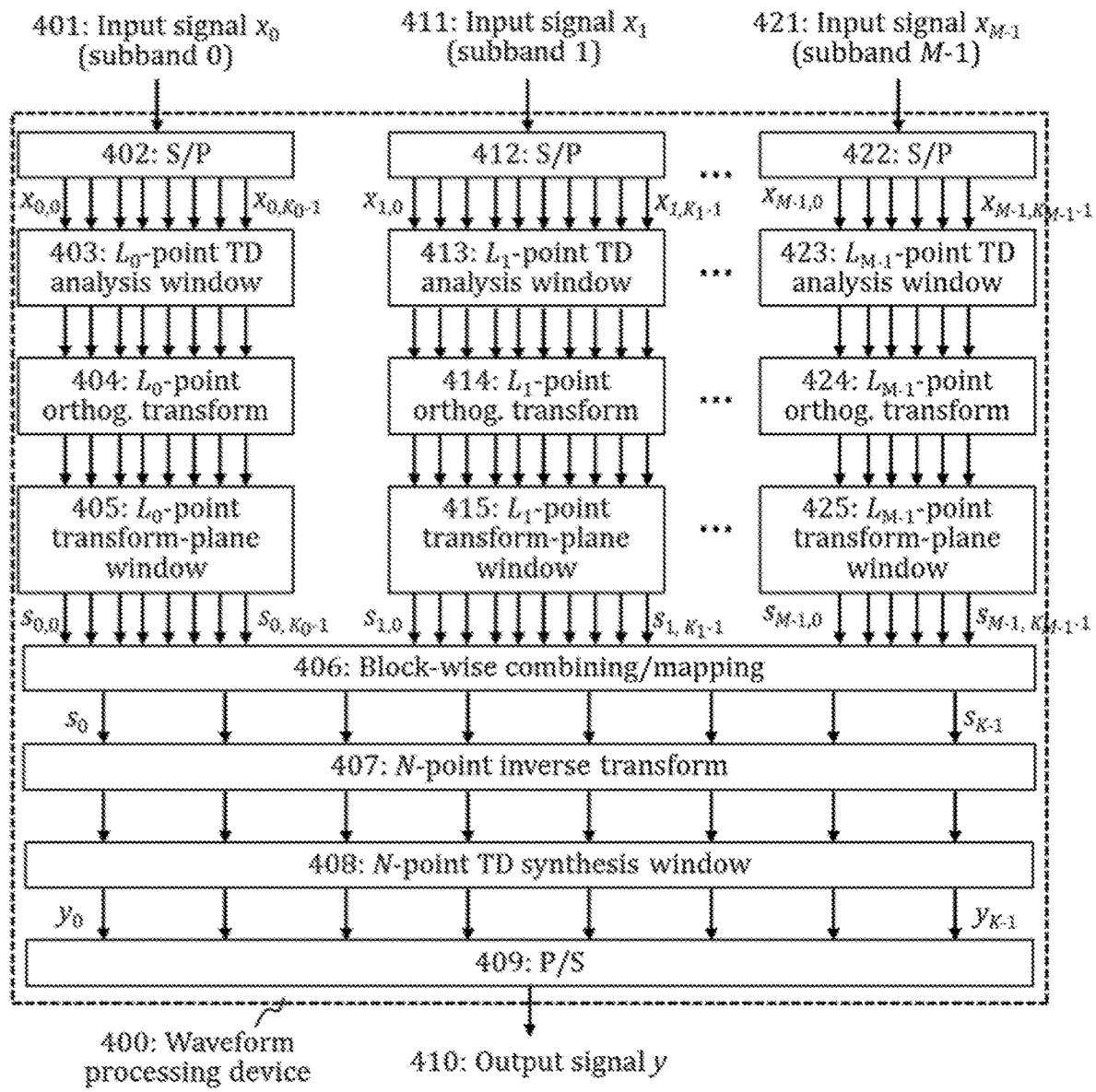
FIGS. 4, 5, 6A, 6B and 6C illustrate exemplary apparatuses according to embodiments.

FIG. 4 illustrates a waveform processing device 400 (more specifically a type of synthesis filter bank) according to an embodiment for meeting the service requirements imposed by 5G NR and for achieving improved channel bandwidth utilization. The waveform processing unit 400 may be a waveform processing unit (or a waveform processing stage) of a radio transmitter configured to perform OFDM or CP-OFDM. The waveform processing unit 400 may correspond to the filtering element 304 of FIG. 3A.

Referring to FIG. 4, the waveform processing unit 400 receives M input signals 401, 411, 421 (discrete-time signals) denoted as $x_0, x_1, \ldots, x_{M-1}$. Said input signals 401, 411, 421 may be provided, for example, by a system block performing IFFT (e.g., block 302 of FIG. 3A) or a system block performing adding of a cyclic prefix to the OFDM signals (e.g., block 303 of FIG. 3A). Each of the M input signals 401, 411, 421 ($x_0, x_1, \ldots, x_{M-1}$) may correspond to a different subband utilized by the OFDM transmitter and may have a different length in samples. Each subband may comprise one or more adjacent orthogonal subcarrier signals according to OFDM or CP-OFDM processing schemes. At least some sets of one or more subcarrier signals relating to different subbands may correspond to different OFDM numerology or timing alignment. OFDM numerology may be defined as OFDM configuration pertaining to sub-carrier spacing, symbol duration, cyclic prefix length and/or resource block size.

Each of the M input signals 401, 411, 421 ($x_0, x_1, \ldots, x_{M-1}$) may be, first, segmented in time-domain using a corresponding serial-to-parallel converter 402, 412, 422 into a subband-specific set of parallel signal blocks. In other words, the input signal $x_0$ (corresponding to a first subband) may be segmented into parallel signal blocks $x_{0,0}, x_{0,1}, \ldots, x_{0,K_0-1}$ (also corresponding to the first subband), the input signal $x_1$ (corresponding to a second subband) may be segmented into parallel signal blocks $x_{1,0}, x_{1,1}, \ldots, x_{1,K_1-1}$ (also corresponding to the second subband) and so on. Each parallel signal block in each subband-specific set $(x_{0,0}, x_{0,1}, \ldots, x_{0,K_0-1}), (x_{1,0}, x_{1,1}, \ldots, x_{1,K_1-1}), \ldots, (x_{M-1,0}, x_{M-1,1}, \ldots, x_{M-1,K_{M-1}-1})$ deriving from input signals $x_0, x_1, \ldots, x_{M-1}$ may have (first) lengths of $L_0, L_1, \ldots, L_{M-1}$, respectively. The number of parallel signal blocks in each set $K_0, K_1, \ldots, K_{M-1}$ may be defined to be different for at least some of the input signals 401, 411, 421 ($x_0, x_1, \ldots, x_{M-1}$), for example, in the case that burst lengths of the input signals in time are different. In other embodiments, the number of parallel signal blocks in each set may be equal (i.e., $K_0=K_1=K_2=\ldots=K_{M-1}=K$).

A first time window function (an analysis window) having a length in samples equal to the length of the corresponding parallel signal blocks is applied, in blocks 403, 413, 423, to each parallel signal block. Each time window function is defined through a set of weight values to be applied (via multiplication) to the time-domain bin values of the corresponding parallel signal blocks. The first time window function may be defined to be the same for all parallel signal blocks within a particular set (e.g., the time window function in block 403 being the same for signals $x_{0,0}, x_{0,1}, \ldots, x_{0,K}$) but different between at least some of the sets (i.e., block 403 may be defined differently from blocks 413, 423). Specifically, each first time window function may be defined not only to comprise different number of samples but also or instead to have different weight values compared to at least one other time window function.

Thereafter, each parallel signal block in each set is transformed, in blocks 404, 414, 424, to transform-domain (i.e., to a transform-plane signal) using an orthogonal transform having a length equal to the length of the parallel signal blocks in the corresponding set (i.e., having a length corresponding to one of $L_0, L_1, \ldots, L_{M-1}$). The orthogonal transform may be one of a discrete Fourier transform, a fast Fourier transform, a Hartley transform and a number theoretic transform. Then, a transform-plane window function having a length in samples equal to the length of the corresponding parallel signal blocks is applied, in blocks 405, 415, 425, to each parallel signal block (now in transform-plane). In other words, the transform-domain bin values of each transform-plane signal are multiplied by the weight values corresponding to the orthogonal transform of the finite-length linear filter impulse response. The resulting $K_0+K_1+\ldots+K_{M-1}$ transform-plane signals are combined and/or mapped signal block-wise in element 406 to produce a set of transform-plane signals having the same length N (a second length). In the case where $K_0=K_1=K_2=\ldots=K_{M-1}=K$, transform-plane signals corresponding to the first signal block $s_{0,0}, s_{1,0}, \ldots, s_{M-1,0}$ are combined/mapped to a transform-plane signal $s_0$, transform-plane signals corresponding to the second signal block $s_{0,1}, s_{1,1}, \ldots, s_{M-1,1}$ are combined/mapped to a transform-plane signal $s_1$, transform-plane signals corresponding to the third signal block $s_{0,2}, s_{1,2}, \ldots, s_{M-1,2}$ are combined/mapped to a transform-plane signal $s_2$ and so on. As signals corresponding to different subbands (denoted by $0, 1, \ldots, M-1$) may have different first lengths $L_0, L_1, \ldots, L_{M-1}$ some of which may not be equal with each other and/or with the second length N, the combining/mapping in block 406 may not be carried out in a straightforward manner for all of the signals $(s_{0,0}, s_{0,1}, \ldots, s_{0,K-1}), (s_{1,0}, s_{1,1}, \ldots, s_{1,K-1}), \ldots, (s_{M-1,0}, s_{M-1,1}, \ldots, s_{M-1,K-1})$. Thus, signals $(s_{0,0}, s_{0,1}, \ldots, s_{0,K-1}), (s_{1,0}, s_{1,1}, \ldots, s_{1,K-1}), \ldots, (s_{M-1,0}, s_{M-1,1}, \ldots, s_{M-1,K-1})$ having the first length $L_0, L_1, \ldots, L_{M-1}$ unequal to the second length N need to be extended with one or more zeros before the combining/mapping in block 406. In the more general case where the number of parallel signal blocks may be different for at least some of the different subbands (e.g., $K_0 \neq K_1$), the combining/mapping may comprise more complicated combination operations for combining the signals in a synchronized manner. For example, the combining/mapping to form a kth transform-plane signal $s_{k-1}$ may comprise, in this case, combining only those transform-plane signals which correspond to subbands for which the number of parallel blocks $K_0, K_1, \ldots, K_{M-1}$ is equal to or greater than k.

The combined transform-plane signals $s_0, s_1, \ldots, s_{K-1}$ are converted, in block 407, back to time-domain using an inverse transform (being specifically an inverse transform of the aforementioned orthogonal transform). As illustrated in FIG. 4, said inverse transform may be defined to be the same for all of the combined transform-plane signals. Specifically, the inverse transform may be defined to have a length of N samples.

As a final filtering step, a second time window function (a synthesis window) having a length of N is applied, in block 408, to each second time-domain signal resulting from the inverse transform in block 407. While the first time window function in blocks 403, 413, 423 was defined independently for each set of parallel signal blocks, the second time window function in block 408 may be the same for all second time-domain signals. Finally, a parallel-to-serial converter 409 is used for concatenating (i.e., joining end-to-end) resulting signals into a single output signal 410 (denoted as y). The output signal 410 may be, for example, converted to an analog signal using a digital-to-analog converter and subsequently transmitted via antenna. The subband signals are detectable from the transmitted signal even with a basic CP-OFDM receiver, making the transmitter-side processing transparent as required by 5G NR.

In some embodiments, the number of input signals M may be equal to one (e.g., only an input signal $x_0$ with first length $L_0$ may be processed). In such embodiments, the element 406 may be configured simply to map the transform-plane signal filtered with a time-window and a first transform-plane window and having the length $L_0$ to a transform-plane signal having the second length N. N may or may not be equal to $L_0$. Said mapping may be achieved by extending said transform-plane signal having the first length $L_0$ with one or more zeros (samples with the value of zero) as discussed earlier.

In some embodiments, overlap-and-save or overlap-and-add processing as discussed in relation to FIGS. 3A and 3B may be implemented in the series-to-parallel converters 402, 412, 422 and the parallel-to-series converter 409 in order to improve spectral containment. Specifically, the overlap-and-save processing may be implemented by overlapping, in the series-to-parallel converters 402, 412, 422, adjacent signal blocks by a first pre-defined number of samples $L_{o,0}$, $L_{o,1}, \ldots, L_{o,M-1}$ which may be different for different series-to-parallel converters 402, 412, 422 and removing (or discarding), in the parallel-to-series converter 409, overlapping sections of adjacent filtered signals (or signal blocks). On the other hand, the overlap-and-add processing may be implemented by adding, in the series-to-parallel converters 402, 412, 422, a second pre-defined number of samples $L_{e,0}$, $L_{e,1}, \ldots, L_{e,M-1}$ having a zero value to each side of each signal block and adding, in the parallel-to-series converter 409, overlapping sections of adjacent filtered signals to each other. The overlap in adjacent signal blocks arises due to the fact that a linear convolution of a sequence (implemented here as the subband-wise multiplication in the transform domain in elements 405, 415, 425) always results in a sequence longer than the original sequence. To give an example of the addition, if $L_{e,0}=32$ and the total length of the signal blocks is 128 including overlapping, 32 last values of the first signal block (i.e., $y_0[97], y_0[98], \ldots, y_0[127]$) are added, in the concatenating, to 32 first values of the second signal block y (i.e., $y_1[0], y_1[1], \ldots, y_1[31]$), respectively, resulting in the following signal values of the output signal $y[97]=y_k[0]+y_{k-1}[97], y[98]=y_k[1]+y_{k-1}[98] \ldots, y[127]=y_k[31]+y_{k-1}[127]$.

In an alternative embodiment, the waveform processing device 400 of FIG. 4 may be generalized to use more than one second time window function. Namely, the second time-domain window function in block 408 having the length N may be defined independently for each signal block. In other words, at most K unique second time domain window functions may be defined in block 408.

Figure 5:
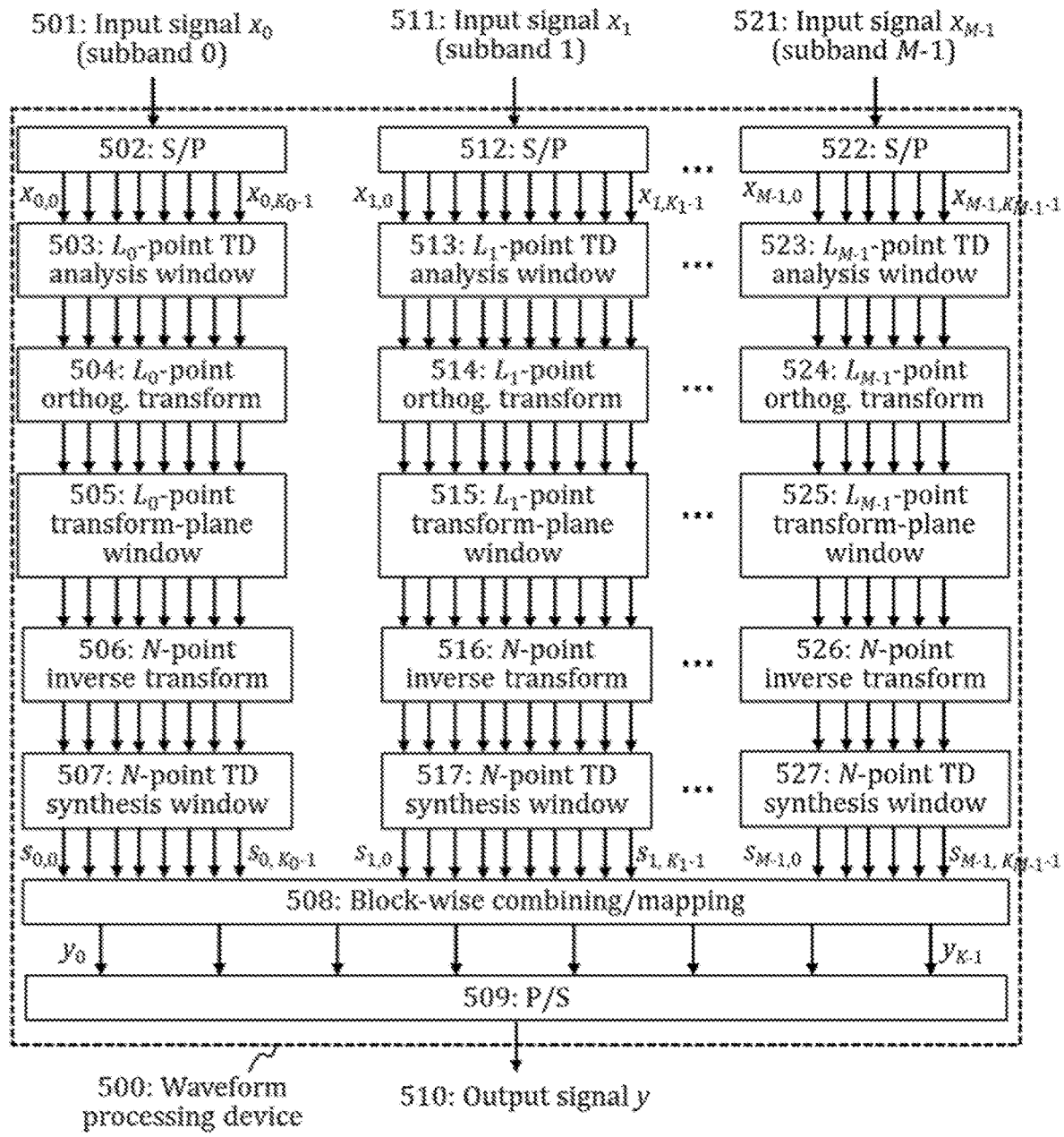

FIG. 5 illustrates another alternative embodiment for a waveform processing device 500 which allows filtering using multiple unique time window functions not only before the transform-domain windowing but also after it. The illustrated embodiment may be similar to the embodiment described in relation to FIG. 4 apart from the differences described in the following. Namely, at least the signals 501, 511, 521 and blocks 502 to 505, 512 to 515, 522 to 525 and 509 may correspond to 401, 411, 421 and blocks 402 to 405, 412 to 415, 422 to 425 and 409 of FIG. 4, respectively.

Referring to FIG. 5, the major difference of the illustrated embodiment compared to the embodiment illustrated in FIG. 4 is that the block-wise combining/mapping operation after the transform-plane windowing (i.e., after block 405 of FIG. 4 or block 505 of FIG. 5) is omitted, at least from this stage. Instead, each windowed transform-plane signals in each subband-specific set is converted, in blocks 506, 516, 526, back to time-domain using an inverse transform (being specifically an inverse transform of the orthogonal transform performed in blocks 504, 514, 524. Said inverse transform may be defined to be the same for all of the windowed transform-plane signals, that is, to have a length of N samples. As the signal length in at least some of the subband-specific sets may be different (having values $L_0$, $L_1, \ldots, L_{M-1}$), windowed transform-plane signals in one or more subband-specific sets may need to be extended by adding zeros in order to perform the N-point inverse transform.

Thereafter, a second time window function (a synthesis window) having a length N is applied, in blocks 507, 517, 527, to each subband-specific set of time-domain signals (i.e., signals deriving from blocks 506, 516, 526). While in the embodiment illustrated in FIG. 4 the same second time window function was applied to each signal in block 408, in this case the second time window function may be defined independently (at least in terms of weight values) for each subband-specific set of signals in blocks 507, 517, 527. In other words, altogether M N-point, potentially unique, time-domain window functions may be defined. Only after this final filtering step are the resulting signals combined/mapped block-wise in block 508. The combining/mapping in block 508 may be performed similar to as was described in relation to block 406 of FIG. 4 resulting in time-domain signals. In other words, the block-wise combining/mapping in block 508 may comprise combining time-domain signals corresponding to different subbands but same signal blocks to produce a set of signal block-specific combined time-domain signals. Finally, the parallel-to-serial converter element 509 concatenates resulting filtered signals to an output signaly 510, similar to the embodiment of FIG. 4.

Figure 6A:
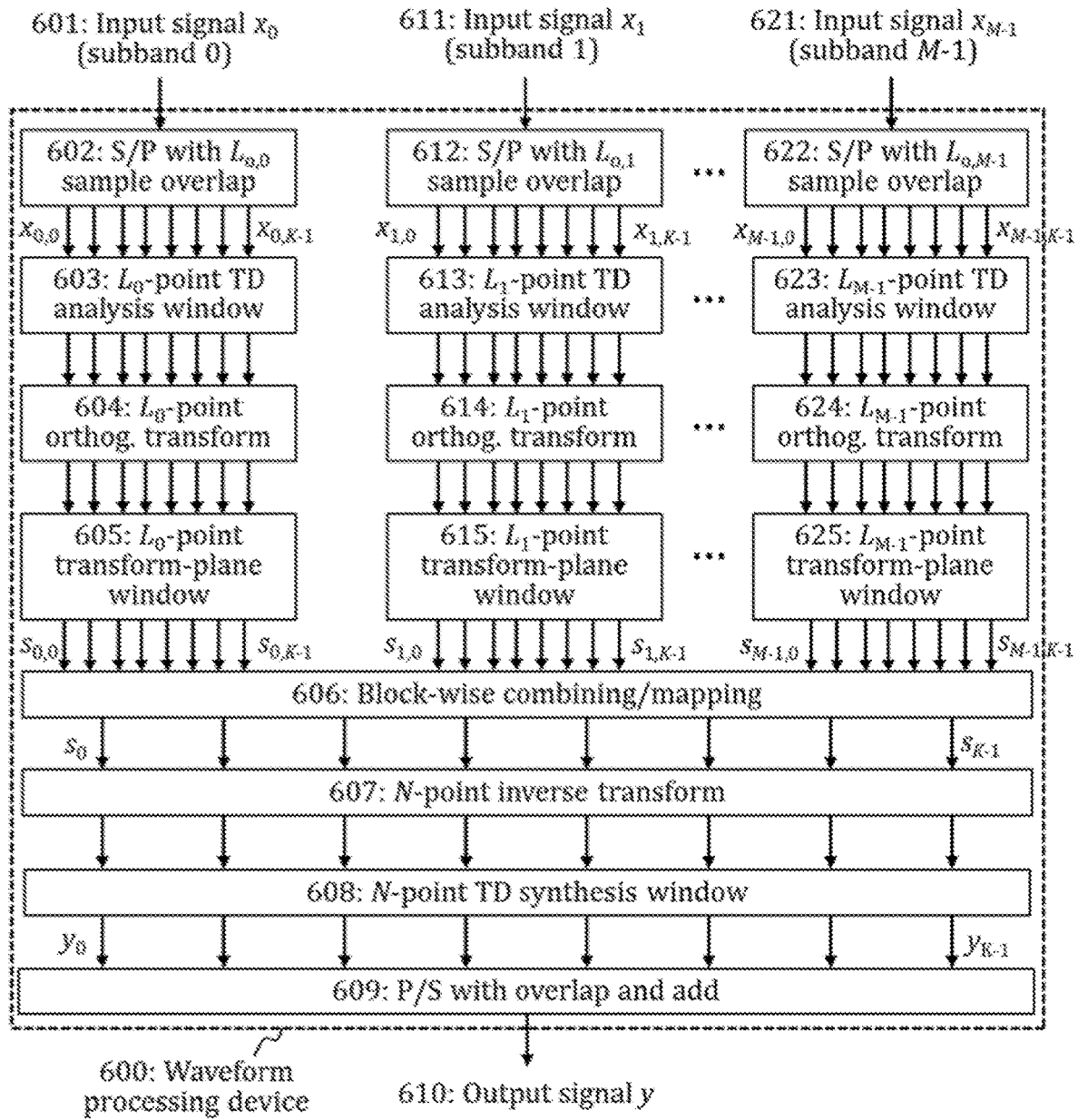
Figure 6B:
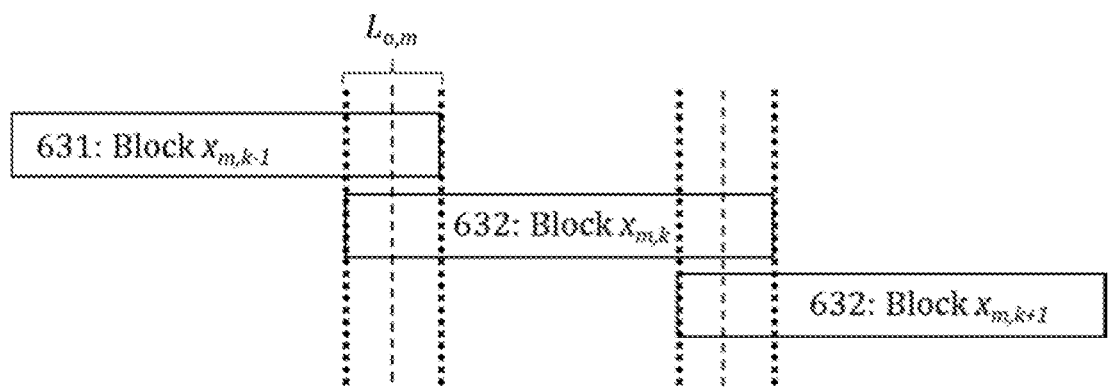
Figure 6C:
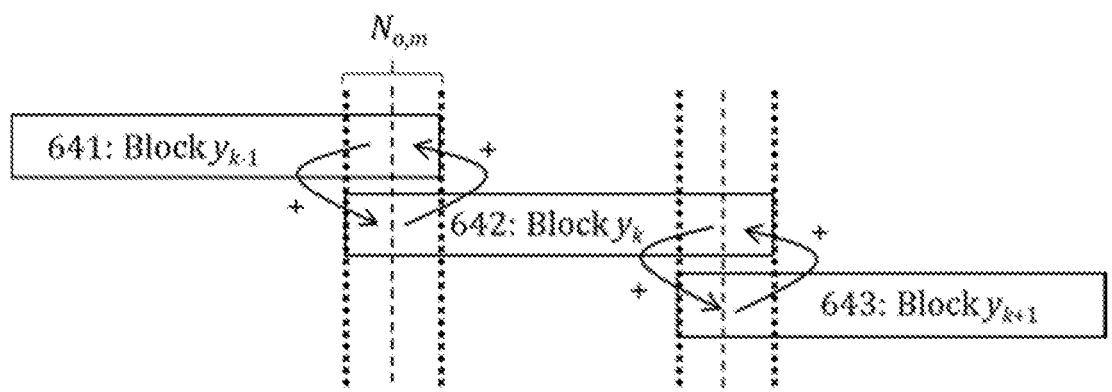

FIGS. 6A, 6B and 6C illustrate an embodiment where a signal segmentation scheme alternative to the overlap-and-add and overlap-and-save schemes (a so-called modified overlap-and-add processing scheme) is used in conjunction with the multi-window FC-based processing as discussed in relation to FIG. 4. The illustrated scheme may be considered a combination of the features of the overlap-and-add and overlap-and-save schemes as used in relation to the embodiment of FIG. 4. Any additional or alternative functionalities discussed in relation to FIG. 4 or FIG. 5 may also be applied as such to the embodiment illustrated in FIGS. 6A, 6B and 6C unless otherwise stated. In this embodiment, it is assumed for simplicity that the number of parallel signal blocks is equal for all the used subbands (i.e., $K_0=K_1=K_2=\ldots=K_{M-1}=K$ using the notation of the previous embodiments).

In the embodiment illustrated in FIG. 6A, the waveform processing unit 600 receives M input signals 601, 611, 621 denoted as $x_0, x_1, \ldots, x_{M-1}$, similar to the embodiment of FIG. 4. However, the segmentation in the serial-to-parallel converter elements 602, 612, 622 is performed similar to the overlap-and-save scheme. Specifically, the adjacent signal blocks of input signals $x_0, x_1, \ldots, x_{M-1}$ 601, 611, 621 are overlapped in the segmentation in the series-to-parallel converters 602, 612, 622 by $L_{o,0}, L_{o,1}, \ldots, L_{o,M-1}$ samples, respectively. The result is M subband specific sets of K signal block specific signals $(x_{0,0}, x_{0,1}, \ldots, x_{0,K-1}), (x_{1,0}, x_{1,1}, \ldots, x_{1,K-1}), \ldots, (x_{M-1,0}, x_{M-1,1}, \ldots, x_{M-1,K-1})$.

The segmentation performed by the serial-to-parallel converters 602, 612, 622 is illustrated in FIG. 6B for three exemplary adjacent signal blocks $x_{m,k-1}, x_{m,k}, x_{m,k+1}$ corresponding to the subband m. In said illustrated examples each signal block is overlapped with its adjacent signal blocks by $L_{o,m}$ samples. In FIG. 6B, the thin dashed lines illustrate the original signal block limits without overlap and the thicker dotted lines illustrate the extent of the overlap.

The processing performed by the waveform processing device 600 in elements 603 to 608, 613 to 615 and 623 to 626 may be similar to the processing performed by the waveform processing device 400 in relation to corresponding elements 403 to 408, 413 to 415 and 423 to 425, the only difference being the extended length of each signal block due to the overlapping. After each second time window function (the synthesis window) having a length of N is applied, in block 608, to each second time-domain signal resulting from the inverse transform in block 407, the parallel-to-serial converter 609 is used for concatenating (i.e., joining end-to-end) resulting signals into a single output signal y 610 by adding overlapping sections of the signal blocks together similar to the overlap-and-add scheme discussed in relation to FIG. 4. Obviously, in this case the overlapping is caused not only by the implementation of a linear convolution as in the case of overlap-and-add processing but also due to the overlapping in the segmentation in the serial to parallel converters 602, 612, 622.

FIG. 6C illustrates the aforementioned process performed by the parallel-to-serial converter 609 for three exemplary adjacent signal blocks $y_{k-1}$, $y_k$, $y_{k+1}$. For example, the central signal block $y_k$ is processed by adding overlapping $N_{o,m}$ samples of the preceding signal block $y_{k-1}$ and the overlapping $N_{o,m}$ samples of the subsequent signal block $y_{k+1}$ to the signal block $y_k$. The number of overlapping samples in the output $N_{o,m}$ may depend on one or more of the size of N, the overlap factor in the input (indicating the extent of the overlapping relative to the overall length of the signal block) and the ratio of transform sizes $N/L_m$. For example, if we have $L_0=32$, $L_{o,0}=8$ and N=64, the number of overlapping samples for the output may be equal to $N_{o,1}=N*L_{o,0}/L_0=16$, assuming same overlap factor for the input and the output. Similar operations are performed for all the other signal blocks $y_0, y_1, \ldots, y_{K-1}$. Consequently, the modified signal blocks are concatenated into the output signal y.

As described in relation to FIGS. 4 to 6, the one or more input signals of the waveform processing device in the proposed multi-window FC-processing scheme may be filtered using a first time-window function defined subband-wise, a first transform-plane window function (e.g., a frequency-domain window) defined subband-wise and a second time-window function having a common definition for all the signals or defined subband-wise. Thus, the waveform processing according to embodiments illustrated in FIGS. 4, 5, 6A, 6B and 6C may entail at most M unique first time window functions, M unique transform-plane window functions and M second time window function though, in some embodiments, some of the first and/or second time window functions and/or the transform-plane window functions may be defined to be the same. In order to utilize multi-window FC-processing to its fullest extent, multi-window optimization of all or some of the 3M window functions (or 2M+1 window functions according to embodiment shown in FIGS. 4 and 6) may be performed. Said multi-window optimization may be performed, for example, before or during the deployment of the waveform processing device or the corresponding transmitter. The optimization problem may be formulated as $$\underset{x}{\text{minimize}} f(x)$$

subject to $$c_k(x) \leq 0, k = 0, 1, \ldots, K_c - 1$$

where x is the parameter vector containing the adjustable window weight values of the first time window, and transform-plane window and the second time window, $f(x)$ is the objective function to be minimized and $c_k(x)$ are the inequality constraints to be satisfied. The number of inequality constraints $K_c$ may be one or more. The objective function may be one of error-vector magnitude (EVM) and the mean-squared (MSE) error between the received and the transmitted symbols. Each inequality constraint may be a function defining the maximum allowable values for one or more of the stopband attenuation target, subband leakage ratio (SBLR), adjacent channel leakage ratio (ACLR), passband ripple and the maximum EVM. The optimization problem may also be formulated such that the objective function is one of the inequality constraints while one or more objective functions act inequality constraints. For example, the goal of the optimization may be to minimize the stopband attenuation target for a given maximum EVM. This optimization problem may also be converted to unconstrained one by minimizing the weighted linear combination of the objective function $f(x)$ and the inequality constraints $c_k(x)$ (with k=0, 1, . . . , $K_c$-1).

To give an example, if the goal is to minimize the average EVM subject to the single inequality constraint (i.e., $K_c$=1) for the stopband attenuation of the subband processing, the optimization problem may be formulated as follows: find the parameter vector x to $$\underset{x}{\text{minimize}} EVM_{AVG}(x)$$

subject to $$A_s(x, \omega) + A_{s,des} \leq 0,$$

where $EVM_{AVG}(x)$ is the average EVM, $A_s(x, \omega)$ is the realized stopband attenuation, and $A_{s,des}$ is the desired stopband attenuation. This optimization problem can be solved using non-linear constrained optimization algorithms.

Figure 7:
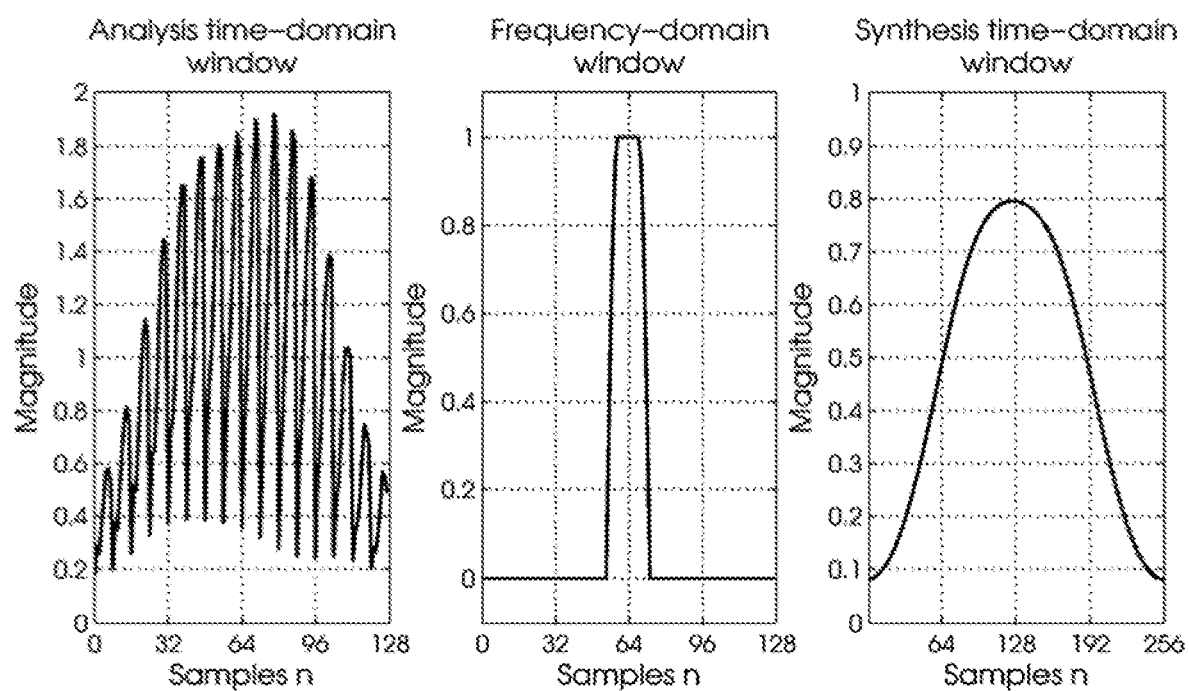
FIG. 7 illustrates an exemplary first time-window function, second time-window function and transform-plane window function for use in embodiments.

FIG. 7 illustrates an example realization for the optimized first and second time windows (analysis time-domain window and synthesis time-domain window) and the optimized transform-plane window (specifically, a frequency-domain window) for one example numerology in one frequency band (one subband). In other words, FIG. 7 illustrates the optimized windows for the waveform processing device of FIG. 6A with M=1. Moreover, the transform sizes are defined as $N=2L_0=256$ and the overlap of the signal blocks is defined to be 50% (i.e., $L_{o,0}=32$ and $N_{o,0}=64$). The optimization is performed according to the exemplary optimization problem formulation given above (i.e., the objective function being average EVM and the inequality constraint being defined for stopband attenuation). The attenuation target is defined to be $A_s$=40 dB and 4 bin transition band is assumed.

For the synthesis time-domain window, shown on the right-hand side of FIG. 7, the shape of the optimized window is similar to the well-known raised-cosine (Hann) window. Similarly, the frequency-domain window, shown in the middle of FIG. 7, has a fairly conventional shape. However, the analysis time-domain window, shown on the left-hand side of FIG. 7, has a very non-typical shape as it does not correspond to any typically used time-domain window. Thus, by optimizing all the windows simultaneously, it is possible to arrive at a solution which would not be obtained by conventional means, e.g., by optimizing the windows separately.

Figure 8:
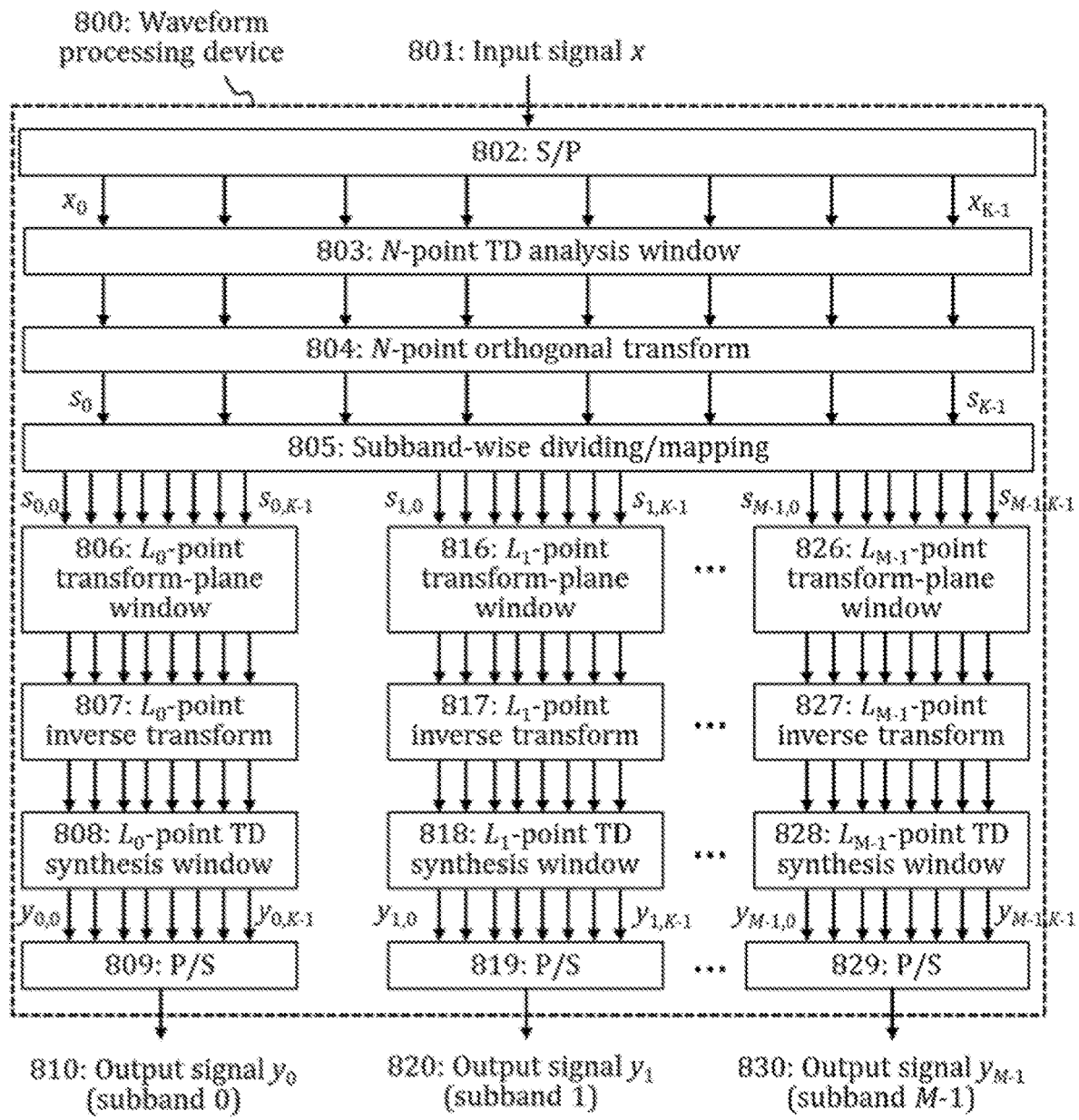
FIG. 8 illustrates an exemplary apparatus according to embodiments.

As discussed in relation FIG. 3B, FC-based filtering may be utilized also or alternatively in the receiving end of a communications link for improving spectral containment. Thus, multi-window FC-based waveform processing may also be implemented in the receiver or specifically in the filtering element 312 of the receiver illustrated in FIG. 3B. FIG. 8 illustrates a waveform processing device 800 (more specifically a type of analysis filter bank) according to an embodiment for a receiver. The waveform processing device 800 may be a waveform processing device (or a waveform processing stage) of a radio receiver configured to perform OFDM or CP-OFDM. The waveform processing unit 800 may correspond to the filtering element 312 of FIG. 3B. It should be emphasized that the use of a transmitter-side filtering element according to any embodiment (e.g., a filtering element as illustrated in any of FIGS. 4, 5 and 6A) does not necessitate the use of a corresponding filtering element according to an embodiment in the receiver side or vice versa.

Referring to FIG. 8, the waveform processing unit 800 receives an input signals 801 denoted as x. Said input signal 801 may be a signal comprising a plurality of adjacent orthogonal subcarrier signals in one or more subbands transmitted by an OFDM or a CP-OFDM transmitter such as the transmitter of FIG. 3A. At least some sets of one or more subcarrier signals relating to different subbands may correspond to different OFDM numerology or timing alignment.

The input signal x 801 may be, first, segmented in time-domain using a serial-to-parallel converter 802 into a set of parallel signal blocks $x_0, x_1, \ldots, x_{K-1}$. Each parallel signal block deriving from the input signals x may have a (first) length of N. In some embodiments, the segmentation in the serial-to-parallel converter element 802 is performed according to the overlap-and-save processing or the modified overlap-and-add processing scheme discussed in relation to FIGS. 6A, 6B and 6C. Specifically, the adjacent signal blocks of input signal x 801 may be overlapped in the segmentation in the series-to-parallel converter 802 by $N_o$ samples. In other embodiments, the parallel signal blocks may be, instead, extended from each side by adding $N_e$ zeros (i.e., samples with a zero value) to increase the length of each signal block, according to overlap-and-add processing.

A first time window function (an analysis window) having a length in samples equal to the length of the parallel signal blocks (i.e., length N) is applied, in block 803, to each parallel signal block. Each time window function is defined through a set of weight values to be applied (via multiplication) to the time-domain bin values of the parallel signal blocks. The first time window function may be defined to be the same for all parallel signal blocks though in other embodiments differing definitions may also be used.

Thereafter, each time-windowed parallel signal block is transformed, in block 804, to transform-domain (i.e., to a transform-plane signal) using an orthogonal transform having a length N. The orthogonal transform may be one of a discrete Fourier transform, a fast Fourier transform, a Hartley transform and a number theoretic transform.

Then, the resulting time-windowed transform-plane signals are divided or mapped, in block 805, subband-wise to M subband-specific sets of K transform-plane signals (or mapped to a single set of K transform-plane signals in the case of the embodiment where M=1). In other words, the transform-domain response at a first subband is isolated from each transform-plane signal $s_0, s_1, \ldots, s_{K-1}$ (each corresponding to a different signal block) to form a set of transform-plane signals specific to the first subband $s_{0,0}, s_{1,0}, \ldots, s_{K-1,0}$, the transform-domain response at a second subband is isolated from each transform-plane signal $s_0, s_1, \ldots, s_{K-1}$ to form a second set of transform-plane signals specific to the second subband $s_{0,1}, s_{1,1}, \ldots, s_{K-1,1}$ and so on. As discussed in relation to transmitter-side embodiments, signals corresponding to different subbands (denoted by 0, 1, ..., M−1) may, also in this case, be defined to have different first lengths $L_0, L_1, \ldots, L_{M-1}$ some of which may not be equal to each other and/or to the second length N which needs to be taken into account in the dividing/mapping in block 805.

After the transform-plane signals have been divided, a transform-plane window function with length $L_0, L_1, \ldots, L_{M-1}$ is applied, in blocks 806, 817, 827, to corresponding subband-specific set of transform-plane signals. The transform-plane window function may be defined independently for each subband-specific set not only in terms of length but also in terms of the shape of the transform-plane window function (i.e., weights of each transform-plane window function). Each windowed transform-plane signal is transformed, in blocks 807, 817, 827, to a time-domain signal using an inverse transform being specifically is an inverse transform of said orthogonal transform. The length of each inverse transform may be equal to the length of the corresponding windowed transform-plane signals $L_0, L_1, \ldots, L_{M-1}$, that is, no zero padding may be applied in the inverse transform. As a final filtering step, a second time window function (a synthesis window) may be applied, in blocks 808, 818, 828, to each subband-specific set of time-domain signals. Similar to the transform-plane window, the second time window function may also be defined independently for each subband-specific set (denoted by 0 to M−1). Moreover, the length of the second time window function may be equal to the length of the signals $L_0, L_1, \ldots, L_{M-1}$ in the corresponding subband-specific set.

Finally, each subband-specific filtered set of signals $(y_{0,0}, y_{0,1}, \ldots y_{0,K-1})$, $(y_{1,0}, y_{1,1}, \ldots, y_{1,K-1})$, ..., $(y_{M-1,0}, y_{M-1,1}, \ldots, y_{M-1,K-1})$ is concatenated, in parallel-to-serial converters 809, 819, 829, to a single subband-specific output signal $y_0, y_1, \ldots, y_{M-1}$ 810, 820, 830. In some embodiments, the concatenating in the parallel-to-serial converter elements 809, 819, 829 is performed according to the overlap-and-add processing or the modified overlap-and-add scheme discussed in relation to FIGS. 6A, 6B and 6C. Specifically, signals corresponding to the adjacent signal blocks in each subband-specific set, e.g., $y_{0,0}, y_{0,1}, \ldots y_{0,K-1}$ for the first set, may be overlapped and added to each other (that is, their overlapping sections are added to each other) in the concatenating in the parallel-to-serial converters 809, 819, 829. In other embodiments, the overlapping sections of adjacent signal blocks may be discarded according to overlap-and-save processing. Each output signal $y_0, y_1, \ldots, y_{M-1}$ 810, 820, 830 may be fed to an OFDM demodulator as illustrated in FIG. 3B.

While the receiver-side waveform processing device discussed in relation to FIG. 8 corresponds to a receiver-side waveform processing device analogous specifically with the transmitter-side waveform processing device of FIG. 6A (though without strictly limiting the S/P and P/S elements 802, 809, 819, 829 to the modified overlap-and-add processing as in FIG. 6A), it should be appreciated that a receiver-side waveform processing device corresponding to either of FIG. 4 or 5 may also be realized in a similar straightforward manner by inverting the transmitter-side features. Therefore, in some receiver-side embodiments one or more of the following features may be implemented:

the number of parallel signal blocks may be different for at least some of the one or more subbands, similar to FIGS. 4 and 5, the N-point first time window function in block 803 may be defined independently for each of $x_{0,0}, x_{0,1}, \ldots, x_{0,K-1}$ and the subband-wise dividing/mapping may be performed right after the serial-to-parallel conversion in block 802 and before the first time-window is applied in block 803 and consequently the first time window may be defined independently for each subband (i.e., subband-specifically), in an analogous manner with FIG. 5.

Moreover, the shape of at least some of the time-window functions 803, 808, 818, 828 and/or transform-plane window functions 806, 816, 826 may be optimized, similar to as was described for the transmitter-side waveform processing device, for improved performance.

The multiwindow approach according any of embodiments described in relation to FIGS. 4 to 8 provides multiple benefits compared to simple FC processing where only a single frequency domain window is used without any time windowing. Notably, low in-band distortion (that is, low inband EVM) may be achieved which enables freely multiplexing different numerologies or asynchronous transmissions in downlink (DL) or uplink (UL). Low in-band distortion is also required to support high modulation and coding schemes (MCSs) like 256-QAM and above. Moreover, increased stopband attenuation may be achieved and thus the out-of-band (OOB) and in-band emission requirements may be fulfilled.

While in the above embodiments, the operation of the waveform processing device were discussed in terms CP-OFDM applications in a transmitter or a receiver, it should be appreciated that the waveform processing according to embodiments is not limited for use only in conjunction with said technology.

Figure 9:
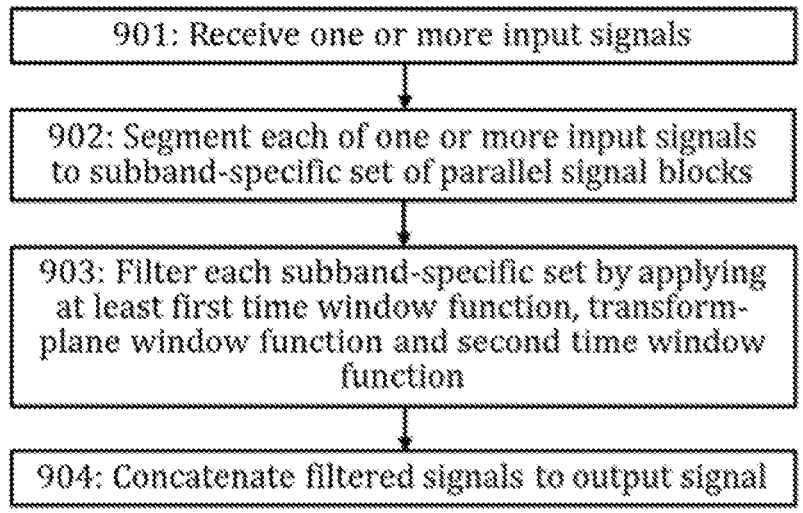
FIGS. 9 and 10 illustrate exemplary processes according to embodiments.
Figure 10:
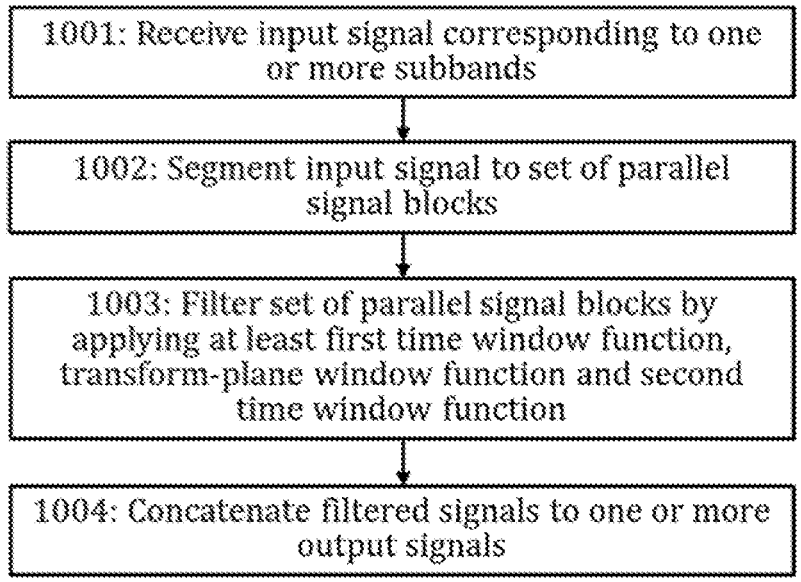

The multiwindow waveform processing utilizing a first time window function, a transform-plane window function and a second time window function according to embodiments may be implemented in a variety of ways which are not restricted to the particular examples shown. FIGS. 9 and 10 illustrate simplified methods according to embodiments for performing said multiwindow waveform processing in transmitter and receiver-sides, respectively. Said two methods may be carried out by the waveform processing apparatuses illustrated in FIG. 4, 5 or 6A and FIG. 8, respectively, or some other apparatus. In some embodiments, one or more additional features discussed in relation to any of FIGS. 4, 5, 6A, 6B, 6C and FIG. 8 may be combined with said methods.

Referring to FIG. 9, the waveform processing device receives, in block 901, one or more input signals. Each of the one or more input signals may correspond to a different subband. The waveform processing device segments, in block 902, each of the one or more input signals to a subband-specific set of parallel signal blocks and filters, in block 903, each subband-specific set by applying at least a first time window function, a transform-plane window function and a second time window function in this order. Finally, the waveform processing device concatenates, in block 904, filtered signals to an output signal.

Referring to FIG. 10, the waveform processing device receiving, in block 1001, an input signal corresponding to one or more subbands (i.e., the input signal is spread over one or more subbands). The waveform processing device segments, in block 1002, the input signal to a set of parallel signal blocks and filters, in block 1003, the set of parallel signal blocks by applying at least a first time window function, and by applying subband-specifically a transform-plane window function and a second time window function in this order. At least the transform-plane window function and the second time window function may be defined and applied subband-specifically (i.e., specific to a particular subband). Finally, the waveform processing device concatenates, in block 1004, filtered signals to one or more output signals, each output signal corresponding to a different subband.

Figure 11:
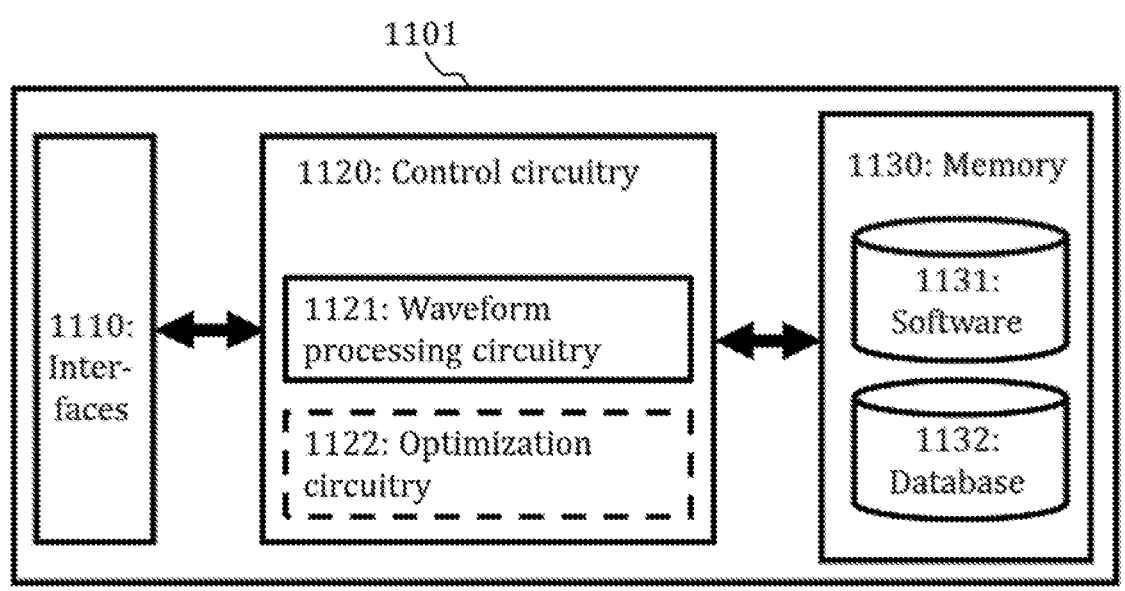
FIG. 11 illustrates an exemplary apparatus according to embodiments.

FIG. 11 illustrates an exemplary apparatus 1101 configured to carry out at least the functions described above in connection with a waveform processing device illustrated in any one of FIGS. 4, 5, 6A, 6B, 6C and 8 and/or at least some of the processes illustrated in any of FIGS. 9 and 10. In some embodiments, the apparatus 1101 may, instead, be configured to carry out the functions described above in connection with the transmitter of FIG. 3A when the filtering element 304 is a waveform processing device as illustrated in FIG. 4, 5 or 6A or with the receiver of FIG. 3B when the filtering element 312 a waveform processing device as illustrated in FIG. 8. The apparatus may be an electronic device comprising electronic circuitries. The apparatus may be a separate entity or a plurality of separate entities. The apparatus may comprise a control circuitry 1110 such as at least one processor, and at least one memory 1130 including a computer program code (software) 1131 wherein the at least one memory and the computer program code (software) are configured, with the at least one processor, to cause the apparatus to carry out any one of the embodiments of the waveform processing device described above.

The memory 1130 may be implemented using any suitable data storage technology, such as semiconductor based memory devices, flash memory, magnetic memory devices and systems, optical memory devices and systems, fixed memory and removable memory. The memory may comprise a database 1132 which may be or comprise the database as described in relation to previous embodiments. The memory 1130 may be connected to the control circuitry 1120 via an interface.

The apparatus may further comprise interfaces 1110 comprising hardware and/or software for realizing connectivity according to one or more communication protocols. The interfaces 1110 may comprise, for example, interfaces enabling the connections between the apparatus 1101 and other apparatuses as described, e.g., in relation to FIGS. 3A and 3B. In some embodiments, the interfaces 1110 may provide the apparatus with communication capabilities to communicate in the cellular communication system and enable communication with network nodes and terminal devices, for example. The interfaces 1110 may comprise standard well-known components such as an amplifier, filter, frequency-converter, (de)modulator, and encoder/decoder circuitries and one or more antennas.

Referring to FIG. 11, the control circuitry 1120 may comprise waveform processing circuitry 1121 configured to perform the waveform processing according to any of embodiments illustrated in FIGS. 4, 5, 6A, 6B, 6C, 8, 9 and 10. In some embodiments, the control circuitry 1120 may further comprise optimization circuitry 1122 configured to perform the optimization of first and second time windows and transform-plane windows. In other embodiments, the optimization of the windows may be performed using a secondary apparatus.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 4, 5, 6A, 6B, 6C, 8, 9 and 10 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 4, 5, 6A, 6B, 6C, 8, 9 and 10 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 4, 5, 6A, 6B, 6C, 8, 9 and 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A waveform processing device for a radio transmitter, the waveform processing device comprising:

at least one processor; and at least one memory including computer program code, the at least one memory and computer program code being configured to, with the at least one processor, cause the waveform processing device to perform receiving one or more input signals, each of the one or more input signals being a time-domain signal produced by a different orthogonal frequency-division multiplexing (OFDM), modulator of the radio transmitter and corresponding to a different subband used by the radio transmitter for transmission; and segmenting each of the one or more input signals to a subband-specific set of parallel signal blocks;

filtering each subband-specific set by applying at least a first time window function, an orthogonal transform, a transform-plane window function, an inverse transform of the orthogonal transform and a second time window function in this order, wherein the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function; and concatenating filtered signals to an output signal for transmission via an antenna of the radio transmitter.

2. The waveform processing device according to claim 1, wherein the filtering comprises performing the following:

applying the first time window function to each parallel signal block in each subband-specific set of parallel signal blocks to produce a subband-specific set of time-windowed signals, wherein the first time window function is defined independently for each subband-specific set;

transforming each time-windowed signal to a corresponding transform-plane signal using the orthogonal transform;

applying the transform-plane window function to each transform-plane signal, wherein the transform-plane window function is defined independently for each subband-specific set;

combining transform-plane signals corresponding to different subbands but same signal blocks to produce a set of signal block-specific combined transform-plane signals;

transforming each signal block-specific combined transform-plane signal to a time-domain signal using the inverse transform; and applying the second time window function to each signal block-specific time-domain signal.

3. The waveform processing device according to claim 2, wherein parallel signal blocks in each subband-specific set have a first length equal to the length of the first time window function, the orthogonal transform and the transform-plane window function for said subband-specific set and the inverse transform and the second time window function have a second length, the memory and computer program code being further configured to cause the waveform processing device to perform:

converting, after the applying of the transform-plane window function, each transform-plane signal having the first length unequal to the second length to a corresponding transform-plane signal having the second length by extending said transform-plane signal having the first length with one or more zeros.

4. The waveform processing device according to claim 2, wherein the memory and computer program code are further configured to cause the waveform processing device to perform one of overlap-and-save processing, overlap-and-add processing, and modified overlap-and-add processing, wherein the overlap-and-save processing comprises:

overlapping, in the segmenting, adjacent signal blocks by a first pre-defined number of samples; and removing, in the concatenating, overlapping sections of adjacent filtered signals, the performing of the overlap-and-add processing comprises:

adding, in the segmenting, a second pre-defined number of samples having a zero value symmetrically to each side of each signal block; and adding, in the concatenating, overlapping sections of adjacent signal blocks of the filtered signals to each other and the performing of the modified overlap-and-add processing comprising:

overlapping, in the segmenting, adjacent signal blocks by a first pre-defined number of samples; and adding, in the concatenating, overlapping sections of adjacent signal blocks of the filtered signals to each other.

5. The waveform processing device according to claim 1, wherein the filtering comprises performing the following:

applying the first time window function to each parallel signal block in each subband-specific set of parallel signal blocks to produce a subband-specific set of time-windowed signals, wherein the first time window function is defined independently for each subband-specific set;

transforming each time-windowed signal to a corresponding transform-plane signal using the orthogonal transform;

applying the transform-plane window function to each transform-plane signal, wherein the transform-plane window function is defined independently for each subband-specific set;

transforming each windowed transform-plane signal in each subband-specific set to a time-domain signal using the inverse transform;

applying the second time window function to each subband-specific set of time-domain signals, wherein the second time window function is defined independently for each subband-specific set; and combining time-domain signals corresponding to different subbands but same signal blocks to produce a set of signal block-specific combined time-domain signals.

6. The waveform processing device according to claim 1, wherein the waveform processing device comprises a filtering element in the radio transmitter based on orthogonal frequency division multiplexing, each subband of the one or more input signals comprising one or more adjacent orthogonal subcarrier signals to be transmitted.

7. The waveform processing device according to claim 6, wherein the one or more input signals comprise adjacent orthogonal subcarrier signals of two or more different numerologies, a length of parallel signal blocks in each subband-specific set being dependent on a numerology of the one or more subcarriers associated with said subband-specific set.

8. The waveform processing device according to claim 1, wherein the memory and computer program code are further configured to cause the waveform processing device to perform optimizing, before the receiving, a plurality of weights defining one or more first time window functions, one or more transform-plane window functions and one or more second time window functions of the waveform processing device to minimize an objective function, wherein the objective function is one of error vector magnitude, average error vector magnitude and mean-squared error between signal blocks of the one or more input signals and corresponding signal blocks of the output signal.

9. The waveform processing device according to claim 8, wherein the optimizing is restricted to values of the plurality of weights causing performance of the waveform processing device to satisfy one or more inequality constraints defined for one or more of stopband attenuation, subband leakage ratio, passband ripple and maximum error vector magnitude.

10. A method performed in a radio transmitter, the method comprising:
  receiving one or more input signals, each of the one or more input signals being a time-domain signal produced by a different orthogonal frequency-division multiplexing (OFDM), modulator of the radio transmitter and corresponding to a different subband used by the radio transmitter for transmission;
  segmenting each of the one or more input signals to a subband-specific set of parallel signal blocks;
  filtering each subband-specific set by applying at least a first time window function, an orthogonal transform, a transform-plane window function, an inverse transform of the orthogonal transform and a second time window function in this order, wherein the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function; and
  concatenating filtered signals to an output signal for transmission via an antenna of the radio transmitter.

11. A computer program embodied on a non-transitory computer-readable medium, said computer program comprising instructions for causing an apparatus for a radio transmitter to perform at least the following:
  receiving one or more input signals, each of the one or more input signals being a time-domain signal produced by a different orthogonal frequency-division multiplexing (OFDM), modulator of the radio transmitter and corresponding to a different subband used by the radio transmitter for transmission;
  segmenting each of the one or more input signals to a subband-specific set of parallel signal blocks;
  filtering each subband-specific set by applying at least a first time window function, an orthogonal transform, a transform-plane window function, an inverse transform of the orthogonal transform and a second time window function in this order, wherein the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function; and
  concatenating filtered signals to an output signal for transmission via an antenna of the radio transmitter.

12. A waveform processing device for a radio receiver of a wireless communication system, the waveform processing device comprising:
  at least one processor; and
  at least one memory including computer program code, the at least one memory and computer program code being configured to, with the at least one processor, cause the waveform processing device to perform
  receiving an input signal being a time-domain signal corresponding to one or more subbands, the input signal having been received via an antenna of the radio receiver;
  segmenting the input signal to a set of parallel signal blocks;
  filtering the set of parallel signal blocks by applying at least a first time window function, an orthogonal transform, a transform-plane window function, an inverse transform of the orthogonal transform and a second time window function in this order, wherein at least the transform-plane window function and the second time window function are defined and applied subband-specifically, the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function; and
  concatenating filtered signals to one or more output signals, wherein each output signal corresponds to a different subband and is to be fed to a different orthogonal frequency-division multiplexing (OFDM), demodulator of the radio receiver.

13. The waveform processing device according to claim 12, wherein the filtering comprises performing the following:
  applying the first time window function to each parallel signal block to produce a set of time-windowed signals;
  transforming each time-windowed signal to a corresponding transform-plane signal using the orthogonal transform;
  dividing each transform-plane signal to one or more subband-specific transform-plane signals to produce one or more subband-specific sets of transform-plane signals;
  applying the transform-plane window function to each transform-plane signal in each subband-specific set, wherein the transform-plane window function is defined independently for each subband-specific set; and
  transforming each windowed transform-plane signal to a time-domain signal using the inverse transform; and
  applying the second time window function to each subband-specific set of time-domain signals, wherein the second time window function is defined independently for each subband-specific set.

14. A method performed in a radio receiver, the method comprising:
  receiving an input signal being a time-domain signal corresponding to one or more subbands, the input signal having been received via an antenna of the radio receiver;
  segmenting the input signal to a set of parallel signal blocks;
  filtering the set of parallel signal blocks by applying at least a first time window function, an orthogonal transform, a transform-plane window function, an inverse transform of the orthogonal transform and a second time window function in this order, wherein at least the transform-plane window function and the second time window function are defined and applied subband-specifically, the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function; and concatenating filtered signals to one or more output signals, wherein each output signal corresponds to a different subband and is to be fed to a different orthogonal frequency-division multiplexing (OFDM), demodulator of the radio receiver.

15. A computer program embodied on a non-transitory computer-readable medium, said computer program comprising instructions for causing an apparatus for a radio receiver to perform at least the following:

receiving an input signal being a time-domain signal corresponding to one or more subbands, the input signal having been received via an antenna of the radio receiver;

segmenting the input signal to a set of parallel signal blocks;

filtering the set of parallel signal blocks by applying at least a first time window function, an orthogonal transform, a transform-plane window function, an inverse transform of the orthogonal transform and a second time window function in this order, wherein at least the transform-plane window function and the second time window function are defined and applied subband-specifically, the orthogonal transform is one of a fast Fourier transform, a discrete Fourier transform, a Hartley transform and a number theoretic transform and the first time window function, the transform-plane window function and the second time window function have been optimized using simultaneous multi-window optimization of the first time window function, the transform-plane window function and the second time window function; and concatenating filtered signals to one or more output signals, wherein each output signal corresponds to a different subband and is to be fed to a different orthogonal frequency-division multiplexing (OFDM), demodulator of the radio receiver.

* * * * *